United States Patent
Elliott et al.

(10) Patent No.: US 10,768,926 B2
(45) Date of Patent: Sep. 8, 2020

(54) MAINTAINING MANAGEABILITY STATE INFORMATION DISTINCT FROM MANAGED METADATA

(71) Applicant: salesforce.com, inc., San Francisco, CA (US)

(72) Inventors: Reid A. Elliott, Denver, CO (US); Jeffrey M. Bartolotta, San Marcos, CA (US); James B. Wunderlich, Burlingame, CA (US); Peter Wisnovsky, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 239 days.

(21) Appl. No.: 15/411,598

(22) Filed: Jan. 20, 2017

(65) Prior Publication Data
US 2018/0210727 A1    Jul. 26, 2018

(51) Int. Cl.
| | |
|---|---|
| *G06F 16/00* | (2019.01) |
| *G06F 8/71* | (2018.01) |
| *G06F 8/65* | (2018.01) |
| *G06F 21/62* | (2013.01) |
| *G06F 16/23* | (2019.01) |

(52) U.S. Cl.
CPC .............. *G06F 8/71* (2013.01); *G06F 8/65* (2013.01); *G06F 16/2365* (2019.01); *G06F 21/629* (2013.01); *G06F 21/6227* (2013.01)

(58) Field of Classification Search
CPC ...................................................... G06F 17/30
See application file for complete search history.

(56) References Cited

U.S. PATENT DOCUMENTS

| | | | |
|---|---|---|---|
| 7,779,039 B2 | 8/2010 | Weissman et al. | |
| 8,601,467 B2 | 12/2013 | Hofhansl et al. | |
| 9,098,365 B2 | 8/2015 | Smith et al. | |
| 2007/0088741 A1* | 4/2007 | Brooks ............ | G06F 17/30575 707/999.103 |
| 2008/0201701 A1* | 8/2008 | Hofhansl .................. | G06F 8/60 717/168 |
| 2012/0066672 A1 | 3/2012 | Smith et al. | |

* cited by examiner

*Primary Examiner* — Khanh B Pham
(74) *Attorney, Agent, or Firm* — Kowert, Hood, Munyon, Rankin & Goetzel, P.C.

(57) ABSTRACT

Techniques are disclosed relating to database techniques for storing metadata for web applications. In some embodiments, manageable state information indicates whether certain entities (e.g., developers or subscribers) are allowed to edit particular fields (e.g., upon installing a version of an application package or when updating a package to a new version). In some embodiments, the manageable state information is stored separately from the corresponding metadata, which may avoid a need to query the metadata to determine manageable state and may allow validation of manageable state rules upon insertion of metadata into a new organization. In some embodiments, a short-lived build organization may facilitate validation of updates to web application packages.

20 Claims, 6 Drawing Sheets

---

Store metadata for one or more applications in one or more database tables of a database system
610

↓

Store, separately from the metadata, manageable state information that specifies permissions for one or more entities to edit the metadata
620

↓

Generate information indicating whether an update to at least one of the one or more applications violates a permission specified by the manageable state information by accessing the manageable state information and without accessing the metadata
630

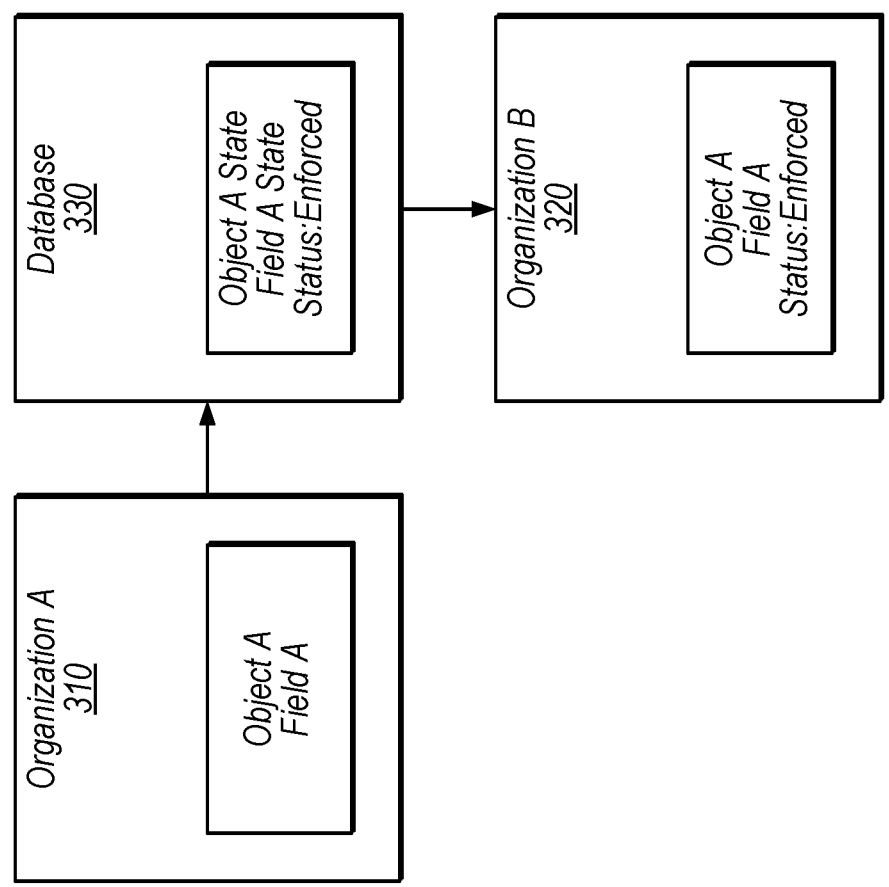

MAINTAINING MANAGEABILITY STATE INFORMATION DISTINCT FROM MANAGED METADATA

BACKGROUND

Cloud application development platforms, such as the Force.com multitenant architecture, may allow individual enterprises and software as a service (SaaS) vendors to develop robust, reliable, and Internet-scale applications. Web applications may access various types of data, e.g., by accessing a database and processing accessed information. In some applications, metadata may be managed, e.g., to control what entities can change or delete metadata when application are updated by a developer or installed by a subscriber, for example. The information that specifies whether metadata can be changed is referred to herein as manageability state information.

BRIEF DESCRIPTION OF THE DRAWINGS

FIG. 3 is a block diagram illustrating exemplary separate storage of manageable state information and corresponding metadata.

Figure 1:
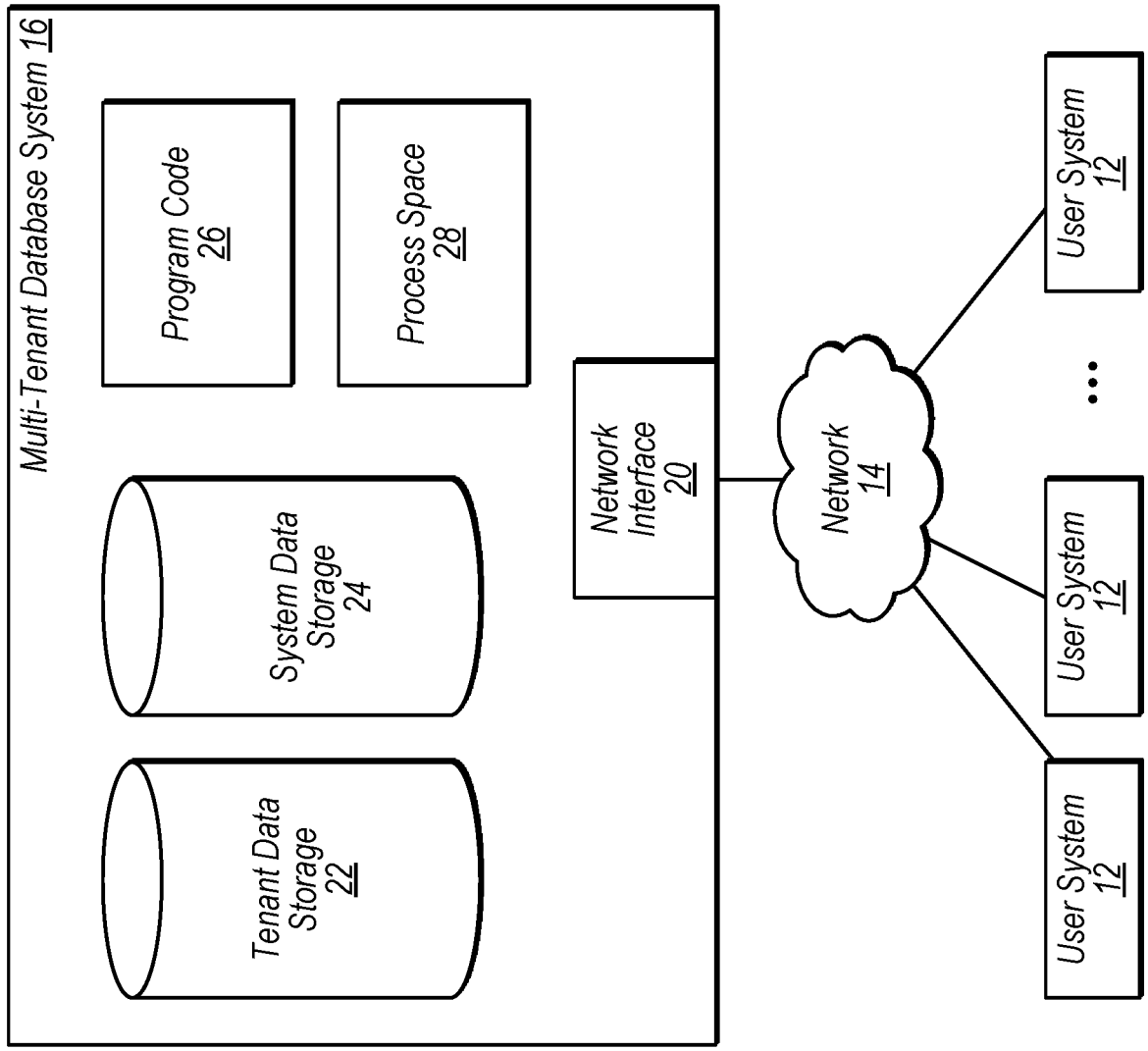
FIG. 1 is a block diagram illustrating an exemplary environment for a multi-tenant database system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "processing element configured to store manageable state information" is intended to cover, for example, an element that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Figure 2:
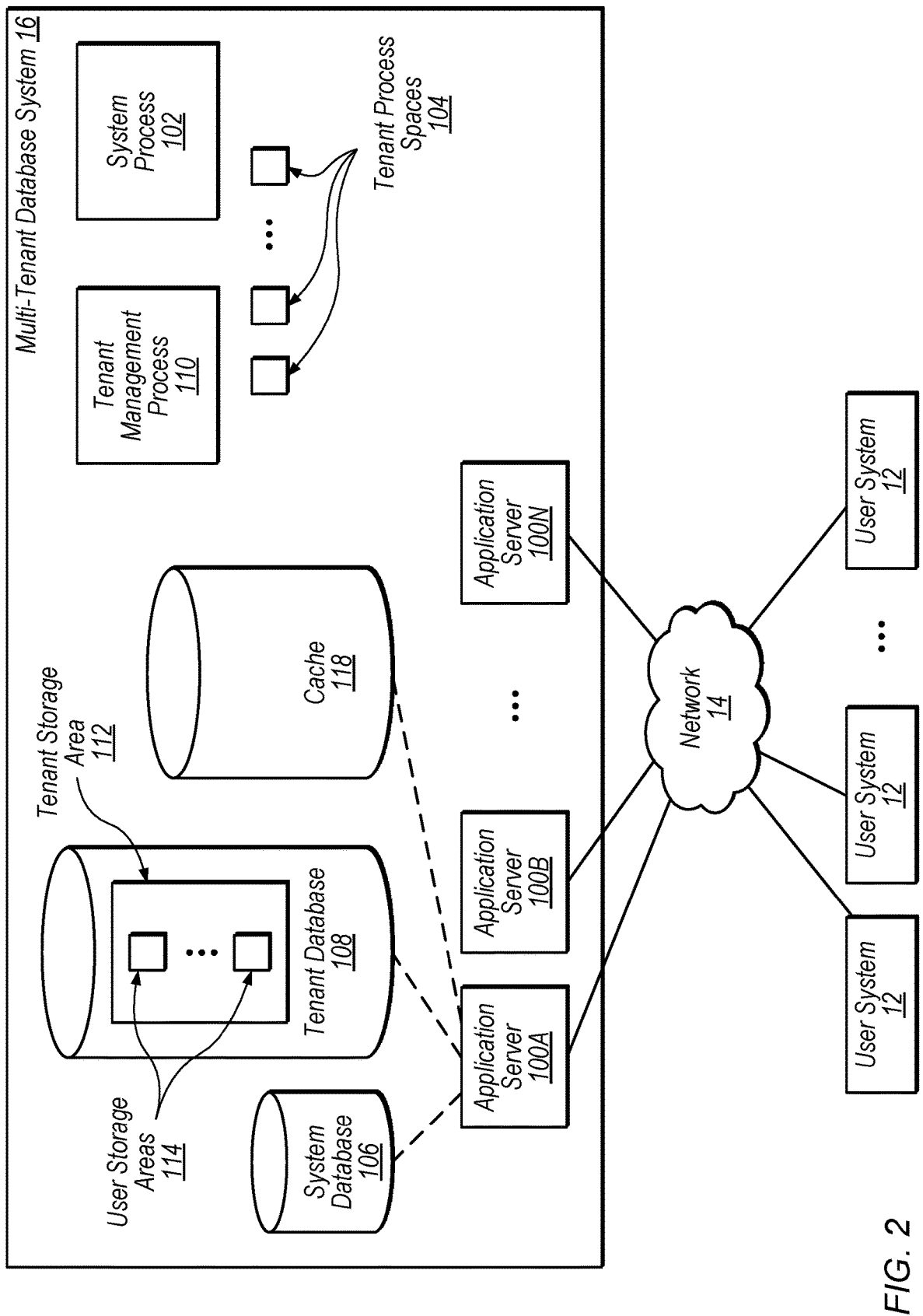
FIG. 2 is a block diagram illustrating an exemplary multi-tenant database system in more detail, according to some embodiments.

This disclosure initially describes, with reference to FIGS. 1-2, embodiments of an exemplary multi-tenant database system that includes an in-memory, multi-tenant cache. (In other embodiments, disclosed techniques may be used in non-multi-tenant environments.) It then describes certain embodiments of manageable state information. Techniques for separately storing manageable state information from corresponding metadata are described with reference to FIGS. 3-6. Techniques for using a short-lived build organization to validate manageable state rules are also described with reference to FIGS. 4-5. In various embodiments, disclosed techniques may improve performance of web applications and/or facilitate development of application packages.

Exemplary Multi-Tenant Database System

FIG. 1 illustrates an exemplary environment in which a multi-tenant database and cache system might be implemented. Note that the disclosed multi-tenant systems are included to illustrative purposes but are not intended to limit the scope of the present disclosure. In other embodiments, similar techniques may be implemented in non-multi-tenant environments such as various client/server environments, cloud computing environments, clustered computers, etc. As illustrated in FIG. 1 (and in more detail in FIG. 2) one or more user systems 12 may interact via a network 14 with a multi-tenant database system (MTS) 16. The users of those user systems 12 may be users in differing capacities and the capacity of a particular user system 12 might be determined by the current user. For example, when a salesperson is using a particular user system 12 to interact with MTS 16, that user system 12 may have the capacities allotted to that salesperson. However, while an administrator is using the same user system 12 to interact with MTS 16, it has the capacities allotted to that administrator.

Network 14 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the networks that the disclosed embodiments may utilize any of various other types of networks.

User systems 12 may communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such a server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least for the users that are accessing a server.

In some embodiments, the system shown in FIG. 1 implements a web-based customer relationship management (CRM) system. For example, in some embodiments, MTS 16 includes application servers configured to implement and execute CRM software applications as well as provide related data, code, forms, web pages and other information to and from user systems 12 and to store to, and retrieve from, a database system related data, objects and web page content. In embodiments of a multi-tenant system, tenant data is preferably arranged so that data of one tenant is kept separate from that of other tenants so that that one tenant does not have access to another tenant's data, unless such data is expressly shared.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Several elements in the system shown in FIG. 1 may include conventional, well-known elements that need not be explained in detail here. For example, each user system 12 may be a desktop personal computer, workstation, laptop, PDA, cell phone, or any WAP-enabled device or any other computing device capable of interfacing directly or indirectly to the Internet or other network connection. User system 12 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 12 to access, process, and view information and pages available to it from MTS 16 over network 14. Each user system 12 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 16 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 12 and its components are operator configurable using applications, such as a browser, that include computer code executable on one or more processing elements. Similarly, in some embodiments, MTS 16 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

According to some embodiments, each MTS 16 is configured to provide web pages, forms, applications, data, and/or media content to user systems 12 to support the access by user systems 12 as tenants of MTS 16. As such, in this embodiment, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

FIG. 2 illustrates exemplary embodiments of an MTS 16 and various interconnections in more detail. In this example, the network interface is implemented as one or more HTTP application servers 100. Also shown is system process space 102 including individual tenant process spaces 104, a system database 106, tenant database(s) 108 and a tenant management process space 110. Tenant database 108 may be sharded across application servers and may be divided into individual tenant storage areas 112, which can be either a physical arrangement or a logical arrangement. Within each tenant storage area 112, user storage 114 might be allocated for each user.

In the illustrated embodiment, each application server 100 also includes at least a portion of a cache 118. In some embodiments, user systems 12 that utilize web applications can request that data be stored in cache 118 (e.g., using a "put" operation) and later retrieve the data (e.g., using a "get" operation) rather than re-generating the data. In some embodiments, capacity limits may be assigned to different users/tenants/partitions, etc. and cached data may be evicted in order to remain below the allotted capacity. In some embodiments, cached data for a particular tenant is kept private from other tenants. Further, the visibility scope for cached data within a particular tenant may be configurable.

In some embodiments, cache 118 is split across multiple application servers 100. In some embodiments, splitting across multiple instances may allow the data in cache 118 to fit in system memory space, which may improve response times relative to storing data for cache 118 in disk storage, for example. As used herein, an "in-memory cache" is a cache that stores data in system memory space (which typically means that the data can be stored in RAM) rather than requiring paging for storage (as is typically required for traditional disc storage, for example). Cache 118 may also be a "multi-tenant" cache in the sense that a single cache is used to provide separate virtual caches for multiple different tenant entities. The different tenants may use the same data structure to store data or different tenants may have different data structures in the cache. In various embodiments, multi-tenant caches enforce data security between tenants such that data from one tenant is not available to other tenants. Thus, as used herein, the term "tenant" in the context of a multi-tenant cache refers to an entity for which cache entries are separately maintained such that different tenants cannot access each other's data. In some embodiments, tenants may authorize other tenants to access their data via the cache, while in other embodiments a given tenant's data may be accessible to only that tenant via the multi-tenant cache (although that tenant may subsequently share data retrieved from the cache, as that tenant desires).

It should also be understood that each application server 100 may be communicably coupled to database systems, e.g., system database 106 and tenant database(s) 108, via, a different network connection. For example, one server $100_1$ might be coupled via the network 14, another server $100_{N-1}$ might be coupled via a direct network link, and another server $100_N$ might be coupled by yet a different network connection. Transfer Control Protocol and Internet Protocol (TCP/IP) are exemplary protocols for communicating between servers 100 and the database system, however, it will be apparent to one skilled in the art that other transport protocols may be used to optimize the system depending on the network interconnect used.

In some embodiments, each application server 100 is configured to handle requests for any user/organization. Because it is desirable to be able to add and remove application servers from the server pool at any time for any reason, there is preferably no server affinity for a user and/or organization to a specific application server 100. In some embodiments, therefore, an interface system (not shown) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as are round robin and observed response time, also can be used. For example, in certain aspects, three consecutive requests from the same user could hit three different servers, and three requests from different users could hit the same server. In this manner, MTS 16 is multi-tenant, wherein the MTS 16 handles storage of different objects and data across disparate users and organizations.

As an example of storage, one tenant might be a company that employs a sales force where each salesperson uses MTS 16 to manage their sales process. Thus, a user might maintain contact data, leads data customer follow-up data, performance data, goals and progress data, all applicable to that user's personal sales process (e.g., in tenant database 108). In some MTS embodiments, since all of this data and the applications to access, view, modify, report, transmit, calculate, eta, can be maintained and accessed by a user system having nothing more than network access, the user can manage his or her sales efforts and cycles from any of many different user systems. For example, if a salesperson is paying a visit to a customer and the customer has Internet access in their lobby, the salesperson can obtain critical updates as to that customer while waiting for the customer to arrive in the lobby.

While each user's sales data may be separate from other users' sales data regardless of the employers of each user, some data may be organization-wide data shared or accessible by a plurality or all of the sales for a given organization that is a tenant. Thus, there may be some data structures managed by MTS 16 that are allocated at the tenant level while other data structures are managed at the user level. Because an MTS may support multiple tenants including possible competitors, the MTS should have security protocols that keep data, applications and application use separate. Also, because many tenants will opt for access to an MTS rather than maintain their own system, security, redundancy, up-time and backup are more critical functions and need to be implemented in the MTS.

In addition to user-specific data and tenant-specific data, MTS 16 might also maintain system level data usable by multiple tenants. Such system level data might include industry reports, news, postings, and the like that are sharable among tenants.

In certain aspects, client systems 12 communicate with application servers 100 to request and update system-level and tenant-level data from MTS 16 that may require one or more queries to system database 106 and/or database system 108. In some embodiments, MTS 16 automatically generates one or more SQL statements (the SQL query) designed to access the desired information.

Each database may generally be viewed as a set of logical tables containing data fitted into predefined categories. Each table typically contains one or more data categories logically arranged in physical columns. Each row of a table typically contains an instance of data for each category defined by the columns. For example, a CRM database may include a table that describes a customer with columns for basic contact information such as name, address, phone number, fax number, etc. Another table may describe a purchase order, including columns for information such as customer, product, sale price, date, etc.

Each database can generally be viewed as a collection of objects, such as a set of logical tables, containing data fitted into predefined categories. A "table" is one representation of a data object, and is used herein to simplify the conceptual description of objects and custom objects according to disclosed embodiments. It should be understood that "table"

and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead and Opportunity data, each containing pre-defined fields.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain aspects, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Overview of Application Packages

U.S. patent application Ser. No. 11/866,911, filed Oct. 2, 2007, which is incorporated by reference herein in its entirety, discusses techniques for using fields to indicate whether changes to an application package may be made, e.g., when a developer organization upgrades a package or the package is installed by a subscriber organization. This information may include information regarding whether metadata in the package is managed, and whether different entities can alter the metadata.

As used herein, a "package" is a metadata object that references the set of metadata objects used in an application in an organization. A "package" is or includes, in certain aspects, a collection of metadata components. A package can also include code (e.g., Apex, javascript, etc. or formulas) and files (e.g., Word documents or other file types). As used herein, an "organization" can mean a single tenant in a multi-tenant system and/or a set of metadata (both application data and metadata) for a particular tenant in a multi-tenant system.

In some embodiments, a user/developer can precisely define a metadata "package" which includes all setup data (e.g., custom object definitions, page layout definitions, workflow rules, etc.) that make up an application. A package may include 0, 1 or more tab sets. The user can then export this package from one "source" organization to a "container" organization that is not associated with any tenant in the database system. An exported package is registered with or listed in an application directory. A user that creates and/or exports a package will be referred to herein as a source user or exporting user or a developer. The source user can choose to have the package name and application listed in a public portion of the application directory. Another user can import the package into a separate "target" organization allowing this organization to use the application independently of the developer organization. A user that views and/or imports a package will be referred to herein as a viewing user or importing user or a subscriber.

To import and install a package into an organization, an import user (subscriber) may navigate to the URL that was generated by the package export process, either through the directory, or via a message from the developer. This URL contains a unique key that identifies a particular exported application and package. The import user may have found this URL by browsing the public directory, or an exporting user may have simply emailed the URL to that user. When the subscriber clicks on the URL they are able to access, view and import the package.

Upon selecting a package for import from the directory, for example, code on the server system takes the metadata from the container organization, selects the appropriate subscriber organization, reads the metadata from the container organization, and writes that metadata into the subscriber organization. Any conflicting metadata (e.g., object or field names) can be resolved by the importing user, e.g., by aborting or by renaming subscriber organization objects, fields, etc. It should be noted that the import process preferably does not overwrite any existing subscriber organization fields. Also, an import user can uninstall the imported application.

In one aspect, installation is a multi-step process with one or more steps performed using an installation wizard. For example, in one aspect, the steps include providing a display of the package contents for the user to examine and confirm they want to install, configuring the security for the existing profiles in the subscriber's organization, importing the package contents, and deploying the application to the intended users. An import user may also choose to customize items or components in the install package.

In certain aspects, packages may be upgraded. For example, if a developer/export user changes the source package, the import user can choose to pull into their organization the change(s) made by the publisher while preserving any data rows the subscriber had created since first importing the package. According to certain aspects, one or more flags may be set in the package definition to determine whether and to what extent customizations to a package may be made and upgraded. In one aspect, a "manageable" field is provided to identify whether customizations to a particular object are subject to upgrade. For example, if the package or an object in the package is marked as managed, the user is allowed to customize the package or the object, and these customizations will not be altered upon upgrading of the package. In another aspect, a "control" field is provided to identify whether an object may be modified by the developer and/or the subscriber. In another aspect, an "immutable" field is provided to identify whether an object can or cannot be altered by anyone. For example, the developer can set the immutable flag so that nobody is able to modify the packages after it has been published. An upgrade process that executes checks each of these fields, where present, to determine the extent that customizations are maintained upon upgrading. These fields may be examples of "manageable state" information, according to various embodiments.

The upgrade model, in some embodiments, is a pull rather than a push paradigm. Pull is more forgiving: if an error occurs during the upgrade process, the administrator can manually address the problem and try again. Because of this leniency, guaranteed upgrades are not required. However, to implement automatic upgrades, in certain aspects, a framework for guaranteed upgrades is provided, so that upgrades can be automatically applied without failure and without human intervention. It should be noted that there are several different ways in which an upgrade to an application package could break down, including, for example the following:

Collisions: A new version of a package adds a custom object with the same name as an existing custom object in the subscribing organization.

Divergent changes: A new version of a package changes some attribute of a field, which has also been changed in the subscribing organization.

Destructive changes: A new version of a package removes a custom object or custom field, changes a custom field type, changes an API name, etc.

Resource limitations: A new version of a package adds 10 or more custom fields, and the subscribing organization is within 1 fields of the edition limit.

Permissions: A new version of a package requires an object such as Campaigns, and the subscribing organization has not licensed that object.

Corruption: Something goes wrong with the upgrade process, leaving the subscribing organization in an invalid state.

Another goal is to allow developers to lock portions of their packages to prevent subscriber organizations from making breaking changes. Because installed metadata is typically treated no differently from locally created metadata, a subscriber can change various controls, rename objects and fields, and generally adversely impact the subscriber's organization.

Another aspect of metadata robustness is protecting intellectual property. Developers may want to prevent subscribers from viewing the internal implementation details of some components, such as SControls and Field Formulas.

In some embodiments, directory upgrades are not automatically distributed to subscribing organizations. Instead, the process requires that a subscriber pull the upgrade to their organization. In certain aspect this includes the developer uploading the new version to the directory, notifying subscribers via an administration UI, email, and/or a visual cue in the Package UI, and manually initiating the upgrade by subscribers.

Some developers may want to convert their existing packages from unmanaged to managed. The state of such installed packages in each subscribing organization is unknown: subscribers could have made any sort of change to the original package content. In certain aspects, a subscriber will the following options:

1) Continue on the unmanaged path, with local customizations and extensions, and
2) Manually restore the package to its original state. The restoration process should not be automated because there may be other local customizations that depend upon the modified package state. These customizations may have to be reimplemented.

In some embodiments, tools are included to help subscribers identify and reconcile changes between the package in their organization, and the original package state. In one aspect, a developer process for converting a package from managed to unmanaged includes flagging the package as 'managed', resolving any errors, such as namespacing custom objects and fields in the package, and publish the package to the directory.

Custom Fields on Standard Objects

In some embodiments, developers can package custom objects and all of their fields, formulas, validations, etc. However, custom fields on standard objects should not be packaged in certain aspects. In certain aspects, developers are able to package individual custom fields on standard objects. This enhancement is closely related to support for publishing extensions to another developer's package: custom fields on a standard object will behave similarly to custom fields on another developer's custom object, in some embodiments. In some embodiments, custom fields are handled as follows:

Custom Fields are automatically (and invisibly to the user) added to the package for all Custom Objects.

Custom Fields on Standard Objects are added individually by the user. A list of Custom Fields would only show Custom Fields for Standard Objects (and for imported and managed Custom Objects, see below).

Custom Objects imported via managed packages are handled identical to Standard Objects with respect to Custom Field packaging.

Dependency Tracking

In one aspect, dependencies are distinguished. For example, in one aspect, dependencies are identified as "highlevel" and "lowlevel" dependencies. "Lowlevel" dependencies, in some embodiments, are automatically derived dependencies that are added to a package before export and the dependencies are invisible to the user. "Highlevel" dependencies, in some embodiments are also added automatically but at the time when the dependent object is added and visibly to the user. This requires that handling of a custom field dependency is treated differently depending on how the dependency was added. In some embodiments, locally created Custom Objects are handled as "lowlevel" dependencies. Individually added Custom Formula Fields may introduce additional dependencies. These dependencies are added as "highlevel" dependencies to the package, i.e., the user is able to review the package contents before the final export. In certain aspects, the same holds true for other components. For example validation formulas will follow the same rules. All validations are added for a custom object ("lowlevel"), but may be individually added for standard (and imported and managed) Objects ("highlevel"). In general, formulas (e.g., Validations, Custom Formula Fields, Field Update Formulas, and Default Value Formulas) may contain references to Custom Fields on external object as well (for example User). These Custom Fields are automatically added to the package as "highlevel" dependencies. Technically this implies that Custom Fields on Custom Objects are added by the "Derived Object" logic that is performed at package export time. Custom Fields on Standard Object are handled by the dependencies spider process, both when a dependent object is added to a package and upon export validation of the package.

In some embodiments, workflow rules, approvals, and workflow actions are managed and are exported as inactive. The subscriber may not change the active flag. All workflow items should be considered as templates that the subscriber may clone, e.g., rules, approvals, and actions, and customize to local needs.

Package Dependencies

In some embodiments, custom objects are treated as atomic units for the purposes of packaging: including a custom object in a package automatically includes all fields, formulas, record types, etc. The code does not analyze dependencies below the object level, because it does not have to, in some embodiments. In certain aspects, an organization is able to package one or more fields on a standard object. In another aspect, an organization is able to package fields, formulas, record types, validations, etc. on custom objects from other developers. Currently custom objects can be added to packages only in their entirety. All custom fields, formulas, record types, etc, are implicitly added to the package. This feature allows a package maintainer to select individual custom fields (on both custom and standard objects) to be included in a package. Any custom fields that are referenced by other object wide properties will automatically be included in the package.

According to one aspect, object properties that should be scanned for references include:
1. Validation Formulas
2. Custom Field Formulas
3. Custom Links
4. Mail Merge
5. Workflow Rules and Actions Formulas (e.g., Formula Fields, Defaults, Validations) may also reference fields on external entities (e.g., User, RecordType, etc). If these references point to custom fields, those fields are automatically included into the package in one aspect.

If the number of custom fields per entity is limited, allowing to package fields on standard objects (or as extensions on custom objects) might rapidly exhaust the supply of custom fields at the installing organization. In certain aspects, at package export time, the user will be presented with a list of components that were automatically added to the package, hence custom objects will not be added without a conscious decision.

Since it is now possible to add "partial" objects to a package, the UI in some embodiments is changed as follows:
1. Custom Fields are added to the list of high-level components that can be manually selected to be added to a package.
2. Custom Objects are a high level choice of components to add to a package. A manually added custom object automatically causes all its custom fields, validations, record types, etc. to be added to the project.
3. Custom Objects referenced by manually added Custom Fields are automatically added as part of the spidering process at package export time.
4. The same logic applies to Custom Validations: A manual choice to add validations, referred objects are automatically included and all validations are included for manually added custom objects.

Package Versioning

In certain aspects, a developer can create a package, upload that package to the application directory, make arbitrary changes to the package contents, and upload it to the directory again. The directory has no knowledge that a relationship exists between the two uploads, in this situation, or what that relationship may entail. To support upgrades, certain aspects introduce package versioning. In some embodiments, a package includes a sequence of versions, each of which includes a set of component references. An "Upload to Directory" button will move to the version. When the developer uploads a package version, the content of that version will no longer be editable: the developer will be able to look at what is in the package version, but will not be able to add or remove members. To make changes to the package, the developer will create a new version, and add the new items there. When the developer uploads the new version to the directory, subscribers are notified that an upgrade to the package is available. Each uploaded package version will correspond to a new container organization, which will include the metadata for that version and all preceding versions. A container organization, in some embodiments, is a separate organization that only contains the contents of a package. All versions of the package will have the same version-invariant package identifier. Additionally, this identifier will be stable across organizations (the developer's organization, repository container organizations, and subscribing organizations) and across instances.

It is possible that during the development of the next major version of a package, the developer will need to release a patch to the current production version. To create the patch/minor version, the developer will create a new package version, place the new version between the current production version and the in-development major version, add items to the new version, and upload the patch to the directory. Subscribers will be notified of the available upgrade. Once a version has been uploaded, a new version cannot be created with a lower sequence number, in some embodiments, (i.e., once version 2 has been created, the developer cannot create a version between versions 1 and 2).

Because upgrades should be additive, any items added to the intervening minor version are automatically included in the next major version as well. When the developer uploads the minor version, any items that are duplicated in the in-development version will be removed, so that the list of items for a specific version includes just those items added in that version. The versioning functionality is independent of whether a package is managed or not. A developer could upload a new version of an unmanaged package. Although subscribers would not automatically be notified of the new version, and would not be able to upgrade, the directory can use the information to determine that the old version has been superseded. In one aspect, the new version is presented by default, but users can still see old versions. In another aspect, the old versions are not accessible at all.

In certain aspects, managed metadata includes two types of information: static information, and dynamic information based on package membership.

1. Managed Packages

In certain aspects, a package entity, e.g., application, includes a boolean 'is Managed' field. If the developer marks a package as managed, i.e., sets the boolean field appropriately, the package becomes upgradeable. Once the package has been uploaded, the 'is Managed' field cannot be turned off, or reset, and the developer cannot make destructive changes to the package contents, in some embodiments.

2. Managed Components

In a developer/publisher organization, a component is managed if it is part of at least one managed package which has been uploaded to the application directory. In a subscribing organization, a component is managed if it is part of an installed managed package. In a developer/publisher organization, when a component changes from unmanaged to managed (either because the developer has added the component to a managed package, or because the developer has changed the package from unmanaged to managed), the system will enforce additional instance requirements. These requirements need to be satisfied prior to upload. These manageability requirements vary by type. The most common instance requirement for manageability is namespacing. Once a managed component has been uploaded (or, for the subscribing organization, installed from the directory), the framework restricts the changes that the user can make to that component. These restrictions may guarantee that the package can be upgraded without conflicts and without breaking dependent functionality. The specific restrictions depend on the entity type, and also vary between the developer's organization and subscribing organizations.

Manageable State

The manageable state of a component, as discussed in the '911 application, was traditionally determined via a secondary query to one or more of the package, version, and member tables. An example query might look like the following:

```
SELECT
    CASE
        WHEN p.source_id = <organization id> AND
            v.is_uploaded = '1' THEN
            eManageableState.MANAGED_PUBLISHED
        WHEN p.source_id = <organization id> AND
            v.is_uploaded IS NULL THEN
            eManageableState.MANAGED_NOT_PUBLISHED
        WHEN p.source_id <> <organization id> THEN
            eManageableState.MANAGED_INSTALLED
        ELSE eManageableState.UNMANAGED
    END AS manageable_state
FROM core.project_member m, core.project p
LEFT OUTER JOIN core.package_version v
    ON v.organization_id = <organization id>
    AND v.package_definition_id = p.projected_id
    AND v.package_version_id = m.added_version_id
    AND v.is_uploaded = '1'
WHERE p.organization_id = <organization id>
    AND p.is_managed = '1'
    AND m.organization_id = <organization id>
    AND m.project_id = p.project_id
    AND m.subject_id = <component id>
```

In some embodiments, the manageable state will be exposed in Java (e.g., using a data dictionary and related controller code) as an enum with the following values:

managed-uploaded: the component is managed and owned by this organization (ie this is the publishing organization).

managed-not-uploaded: the component is owned by this organization and is in a managed package, but has not been uploaded.

managed-installed: the component is managed and owned by another organization (i.e., the component is part of a managed package installed from the directory).

unmanaged: the component is unmanaged.

In the developer/publishing organization, setup must be managed to prevent the developer from uploading an upgrade that could break the functionality of the package, in some embodiments. Examples of potentially breaking changes include: deleting any managed component, especially a custom object or custom field, and changing the API name of a custom object or custom field. The restrictions are enforced, in certain aspects, when the developer attempts to upload the upgraded package version. In one aspect, the restrictions are enforced within each entity UI so that the developer never makes the invalid changes (especially since some changes may be difficult or impossible to revert).

In the subscribing organization, setup must be managed, in some embodiments, to prevent the subscriber from making changes to managed components that could cause conflicts with local customizations, new packages, and upgrades to existing packages. Additionally, setup should prevent the subscriber from making changes that could break the functionality of the package, such as external integrations. In one aspect, these restrictions are enforced in each entity UI via display changes (separating local customizations and published content, disabling links and buttons, etc.) and error messages.

Certain enhancements to object and field information described below provide the information to implement these restrictions. In one aspect, each object or field includes an attribute, with the following possible values:

packageable: the entity is packageable, but not upgradeable.

manageable: the entity is packageable, and may be upgraded in a managed package.

immutable: the entity is packageable, and may be upgraded in a managed package; however neither the developer nor subscribers can change any non-internal fields.

not specified: the entity is not packageable.

Additionally, in some embodiments, for each manageable object or field, each attribute will include an attribute that determines what changes if any can be made to that field if the component is managed. Categories of field manageability according to one aspect include:

Subscriber-controlled: the installation process sets the field to the default value specified in the data dictionary. The subscriber may change the value locally. The upgrade process ignores the field, and preserves any subscriber changes.

Overrideable: the developer specifies an initial value, and may modify the value in an upgrade. The subscriber may also change the value locally, and may revert to the most recent published value at any time.

Publisher-controlled: the developer specifies the value, and may modify the value in an upgrade. The subscribing organization cannot modify or override the value.

Immutable: once uploaded, neither the developer nor the subscribing organization can modify the value.

Internal: the field is system-controlled. Neither the developer nor the subscriber can explicitly change the value. It may be set either at installation or as part of usage.

Compound: the field includes multiple columns or flags, with a combination of different manageabilities.

For bit vector fields, manageability may be specified either for the field as a whole, or for each bit vector item. The attribute for bit vector fields and items can be subscriber-controlled, publisher-controlled, immutable, or internal, as described above. Bit vector items and fields should not be overrideable, because, in certain aspects, the overrideable behavior requires ternary logic (true|false|default). If each bit vector item specifies its manageability, the field manageability is compound. Multi-column fields can be handled in a similar fashion. Unlike bit vector fields, overrideable columns or multi-column fields are feasible.

Overrideable fields may allow the subscribing organization to make changes to field values while retaining the original published values. Upgrades from the subscriber will update the published values but should not change any overridden values. The subscriber can revert back to the latest published value. In certain aspects, overrideable fields can be stored in a general override table, in extra columns in a base table, or in an entity specific override table, in an override entity.

Exemplary Separate Storage of Manageability State

As discussed above, in disclosed embodiments of the '911 application, manageable state fields may be persisted into replicated tables and determined at runtime (e.g., by querying the database and comparing installed metadata against replicated data). This may require various queries to export manageable state and may not allow manageable state rules to be enforced upon initially inserting metadata into an organization. This may cause challenges for developers in validating whether manageable state rules are met when upgrading a managed application.

Therefore, in some embodiments, manageable state is decoupled from the database tables that store managed metadata. In some embodiments, the manageable state information is stored separately with a version of an application package. Further, in some embodiments, decoupled manageable state facilitates creating short-lived organizations in which applications can be installed and validated, using manageable state data.

FIG. 3 illustrates an exemplary situation where metadata for organization A 310 is stored in a field A that is in turn stored in an object A (e.g., which may be a database table). As shown, manageability state information for object A and field A is stored separately in database 330 with an indication that the status is enforced. Therefore, when a package that includes object A is installed at organization B 320, the state information may be inserted into organization B 320 before the metadata itself is inserted. This state may then be used to enforce rules when the user attempts to insert the metadata into the org. For example, organization B may be a build calculated at runtime). This object may also store other information such as a minimum and maximum package version ID. The manageable state may be determined and stored in developer organizations when the organization is bootstrapped. The manageable state may be stored in subscriber orgs when the package is installed or upgraded. Application packages that utilize the techniques discussed herein may be referred to as "second generation packages," which is a logical name for a set of package functionality while a "version" of a second generation package is the actual data that is installed in a subscriber organization.

The following table sets out a non-limiting exemplary list of manageable state values that may be valid in developer and/or subscriber contexts:

| | Valid In | | |
|---|---|---|---|
| ManageableState | Dev | Sub | Description |
| MANAGED_RELEASED | X | | The component is managed and owned by this organization. |
| MANAGED_RELEASED_PROTECTED | X | | Can be deleted by the dev. Protected components can't be linked to or referenced by components created in a subscriber org. A developer can delete a protected component in a future release without worrying about failing installations. However, once a component is marked as unprotected and is released globally, the developer can't delete it. |
| MANAGED_RELEASED_UI_DELETED | X | | The component is managed-released but is proposed to be deleted or deprecated. |
| MANAGED_RELEASED_UI_DEPRECATED | X | | Same as MANAGED_RELEASED for rules |
| MANAGED_RELEASED_UI_DEP_BY_OTH | X | | Child of a deprecated component (proposed-deprecated or managed-deprecated) |
| MANAGED_REL_UI_DEP_BY_OTH_PERM | X | | |
| MANAGED_INSTALLED | | X | The component is managed and owned by another organization (ie the component is part of a managed package installed from the AppExchange). |
| MANAGED_INSTALLED_DELETED | | X | |
| MANAGED_INSTALLED_UI_DEP | | X | Same as MANAGED_INSTALLED, but not visible because of orgMin rules. This is only used in the BT UI where we DON'T hide these rows |
| MANAGED_INST_UI_DEP_BY_OTH | | X | Same as MANAGED_INSTALLED_UI_DEP, but for children of something that is deprecated in the sub |
| MANAGED_INST_UI_DEP_BY_DEV | | X | Visible to the sub, but letting them know that the dev has actually deprecated this component (or parent) for net-new-installs |
| MANAGED_BETA | X | | The component is owned by this organization and is in a managed package, but has not been released. |
| MANAGED_DELETED | X | | The component is owned by this organization, has been managed released, and is now permanently deleted or deprecated |
| MANAGED_DEPRECATED | X | | |
| UNMANAGED | X | X | The component is unmanaged. |
| UNMANAGED_UI_DEP_BY_OTH | X | X | |
| MANAGED_DELETABLE | | X | The component is managed and installed, but deletable by the subscriber. | organization for checking whether updates to an application package that includes object A satisfy manageability state rules. Speaking generally, there may be refactoring cases where original metadata is not valid but its state is. Separating the two may allow enforcement of rules on any changes while the user is able to refactor the metadata itself to make it valid again.

Thus, in some embodiments, the manageable state of an entity is persisted in an organization scoped package member object at discrete points in time (e.g., instead of being As discussed above, maintaining manageable state information separately from metadata may allow rules to be enforced when inserting metadata into a build, even when the metadata does not yet exist in the build when it needs to be validated.

Exemplary Short-Lived Build Organization

In the multi-tenant context, different organizations are often used to keep data separate for different groups of users. In some embodiments, a short-lived build organization can be used to validate packages contents before the package is released (e.g., to validate that changes made by the developer since the previous version are valid), using the separately-maintained manageable state information discussed above. Some testing of application logic may optionally occur at this time, in some embodiments.

Figure 4B:
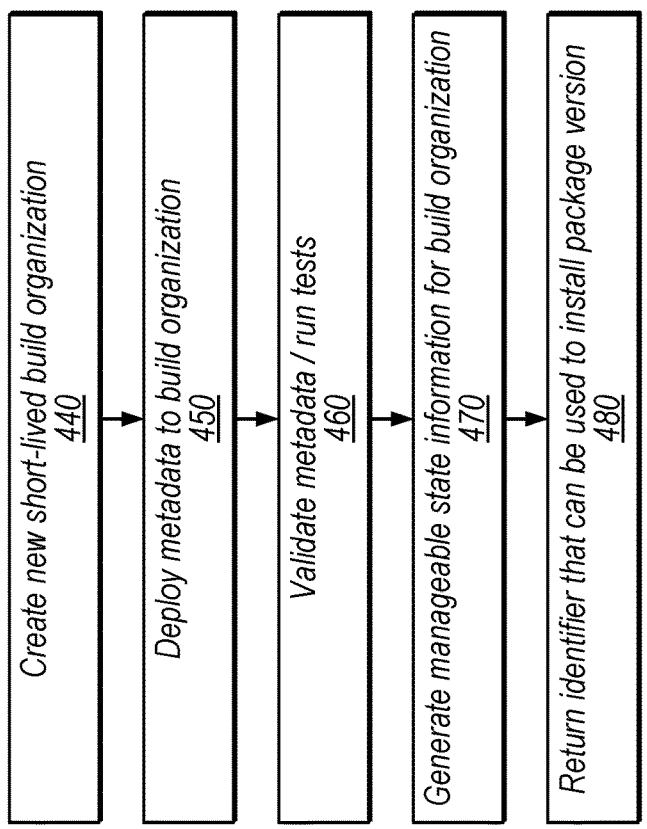
FIGS. 4A-4B are flow diagrams illustrating exemplary methods for using a build organization, according to some embodiments.
Figure 4A:
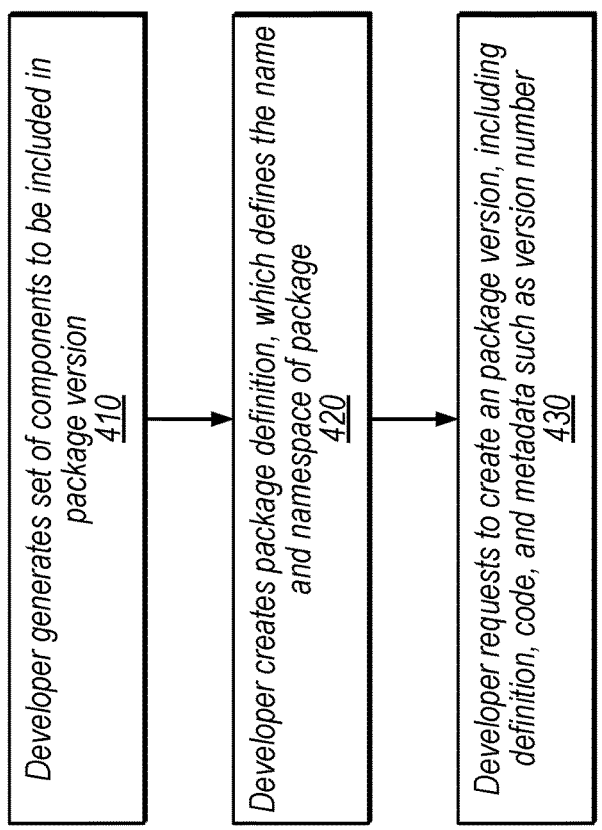

FIG. 4A is a flow diagram illustrating an exemplary method for requesting to create an package version, according to some embodiments. In some embodiments, the operations shown in FIGS. 4A-4B are performed using an environment hub that owns a PackageDefinition, creates and destroys a build organization, deploys metadata to the build org, and combines and compresses information (e.g., as a zip file) for storage. In some embodiments, the environment hub creates a PackageVersionDefinition object.

At 410, a developer creates a set of components to be included in a package version. Note that the system may support running application instances on different versions.

At 420, the developer creates a package definition, which defines the name and namespace of the package.

At 430, the developer requests to create a package version. In the illustrated embodiment, the request includes the package definition, code (e.g., to be zipped and used for the package), and metadata such as the version number.

FIG. 4B is a flow diagram illustrating an exemplary method for using a build org to create a package version, according to some embodiments. In some embodiments, the operations in FIG. 4B are performed in response to the operations of FIG. 4A.

At 440, a new short-lived build organization is created. This organization may enforce manageable state rules when metadata is deployed and may provide status information to the environment hub At 450, metadata is deployed to the build organization. In some embodiments, manageable state information is deployed to the build organization prior to inserting the metadata, which may allow validation to be performed on insertion of the metadata into the build organization.

At 460, the metadata is validated and tests are run. This may include, for example, validating that any metadata fields removed since the ancestor version are deletable and/or validating that any metadata fields that have been removed are declared in a list of deleted fields for the version.

At 470, manageable state information is generated for the build organization (e.g., for the new version, and this manageable state information may be different relative to the ancestor version, e.g., based on new fields in the new version).

At 480, an identifier is returned that can be used to install the package version (e.g., if the validation is successful).

In some embodiments, the disclosed techniques allow correct management of the instance where the package version is created. In embodiments, the system allows running instances on different versions. For example, an instance or pod could be upgraded to version 206 while other instances are running version 204. In some embodiments, the disclosed techniques would allow code for the package version developed using a 204 organization to create a build org on an instance running version 204 (similarly, an instance running 206, or another version, could be used for the build org if desired).

Consider, for example, an exemplary situation with a version 1.0 of a package and a version 1.1 of the package. In the illustrated example below, an addOrder function has an extra parameter (Date settleDate) in the 1.1 version. Traditionally, this may have caused the 1.0 extension class to fail to compile against the 1.1 base package class.

Version 1.0

```
Base Package
public class OrderUtils {
    void addOrder(User customer){...}
}
Extension Package
global class OrderApi {
    global void addOrder( ) {
        OrderUtils ou = new OrderUtils( );
        ou.addOrder(getUserFromContext( ));
    }
}
```

Version 1.1

```
Base Package
public class OrderUtils {
    void addOrder(User customer, Date settleDate){...}
}
Extension Package
global class OrderApi {
    global void addOrder( ) {
        OrderUtils ou = new OrderUtils( );
        ou.addOrger(getUserFromContext( ), new Date( ));
    }
}
```

In disclosed embodiments, however, the separation of state allows comparison at insert time without the presence of previous metadata. In some embodiments, the basic steps in developing the 1.1 package may be as follows:

Deploy Metadata to build org for 1.0 package

Send call from environment hub to build org requesting manageable state information for all of the Entities in the package which is being built.

Each EntityObject is responsible for creating or updating a corresponding manageable state information object that captures the immutable data for their specific case.

Figure 5:
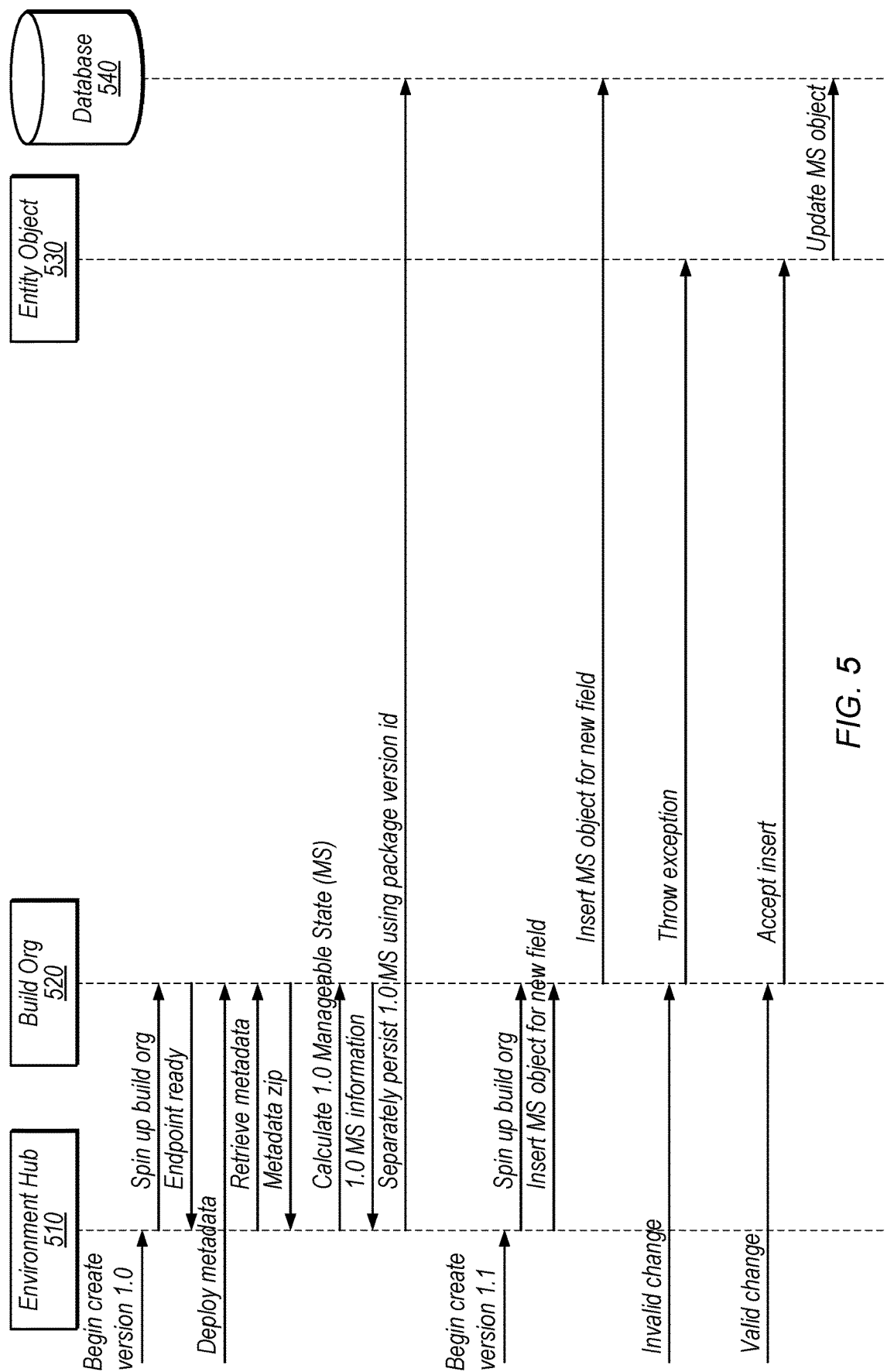
FIG. 5 is a communications diagram illustrating exemplary use of a build organization.

Store a copy of the manageable state information object in the environment hub org, identified by PackageVersionDefinitionId, SubjectKeyPrefix, SubjectNameNorm Create 1.0 package Developer develops 1.1 metadata Begin 1.1 package Version Create Request Environment hub spins up 1.1 Build org Environment hub manageable state information objects from step 3 into 1.1 build org Endpoint Ready State sent to client Client deploys metadata to build org, all inserts are validated against the manageable state information objects FIG. 5 is an exemplary sequence diagram that illustrates the flow of custom field validation for a field released in a 1.0 package and updated in a 1.1 package, according to some embodiments. In the illustrated example, the environment hub 510 receives a request to being creating a 1.0 version. The environment hub 510 spins up a build org 520 and receives and indication that the endpoint is ready. The developer then deploys metadata to the build org 520, which is retrieved by the environment hub 510. The environment hub determines 1.0 manageable state (MS) from the build org and separately persists the 1.0 MS in the database 540 using the package version ID.

For version 1.1, the environment hub 510 receives a request to being creating the 1.1 version and spins up a build org. The environment hub 510 inserts a manageable state object for the new field, which is persisted in database 540. Upon an invalid change to the new field, an exception is thrown. Upon a valid change to the field (e.g., based on the MS object), the build org 520 accepts the insert to the entity object 530 and the manageable state object is updated in database 540.

Similar techniques may be used for Apex fields, in some embodiments, which may also use one or more of an MDAPI Apex class, class context, and apex entity object to check manageable state on metadata insert.

Exemplary Method

Figure 6:
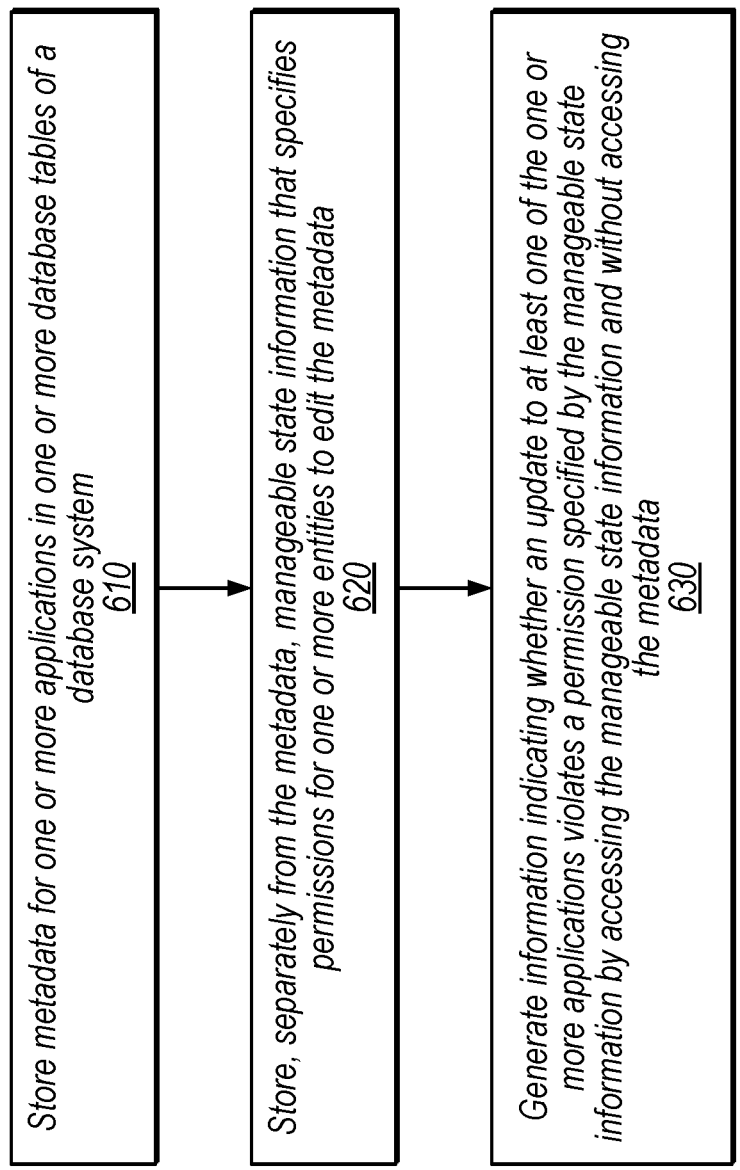
FIG. 6 is a flow diagram illustrating an exemplary method for storing manageable state information separately from corresponding metadata.

FIG. 6 is a flow diagram illustrating a method for separately storing manageable state information, according to some embodiments. The method shown in FIG. 6 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 610.

At 610, in the illustrated embodiment, a computing system stores metadata for one or more applications in one or more database tables of a database system. The applications may be managed using versioned packages, for example.

At 620, in the illustrated embodiment, the computing system store manageable state information separately from the metadata. In some embodiments, the metadata specifies permissions for one or more entities (e.g., developers, subscribers, etc.) to edit the metadata.

At 630, in the illustrated embodiment, the computing system generates information indicating whether an update to at least one of the one or more application violates a permission specified by the manageable state information by accessing the manageable state information and without accessing the metadata. This may increase processing efficiency, e.g., by avoiding a need to query the metadata itself to determine manageable state. Further, it may facilitate previously unavailable operations such as validating metadata upon insertion into an organization.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

Various operations described herein may be implemented by a computing device configured to execute program instructions that specify the operations. Similarly, various operations may be performed by circuitry desired or configured to perform the operations. In some embodiments, a non-transitory computer-readable medium has program instructions stored thereon that are capable of causing various operations described herein. As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   storing, by a computing system, metadata for one or more applications in one or more database tables of a multi-tenant database system, wherein the metadata includes one or more custom database table definitions that specify sets of fields included in one or more custom database tables, wherein the fields include one or more tenant-specified custom fields that are not included in a standard database table definition used by one or more other tenants of the multi-tenant database system;
   storing, by the computing system in a separate database table from the metadata, manageable state information that specifies permissions for one or more entities to edit the metadata to alter the set of fields included in one of the custom database table definitions; and
   generating, by the computing system, information indicating whether an update to at least one of the one or more applications violates a permission specified by the manageable state information by accessing the manageable state information and without accessing the metadata.

2. The method of claim 1, further comprising:
   inserting the manageable state information into an application package prior to inserting the metadata into the application package and
   using the manageable state information to enforce one or more rules on insertion of the metadata into the application package.

3. The method of claim 1, wherein the one or more custom database table definitions further include one or more custom indexing columns that are not included in the standard database table definition and wherein the computing system stores data for both the one or more custom database table definitions and the standard database table definition using the same multi-tenant data structure.

4. The method of claim 2, wherein the application package is a new package version that includes one or more changes to a previous package version, wherein the one or more rules are used to determine whether the one or more changes are allowed.

5. The method of claim 4, further comprising generating updated manageable state for the new package version and separately storing the updated manageable state.

6. The method of claim 1, wherein the manageable state information specifies that at least one field is unmanaged, at least one field that is managed and can be deleted, and at least one field that is managed and cannot be deleted.

7. The method of claim 1, wherein the manageable state information specifies that at least one field is immutable and cannot be altered by anyone.

8. The method of claim 1, wherein the manageable state information specifies, for each field of the metadata, whether the field is immutable, unmanaged, or managed.

9. A non-transitory computer-readable medium having computer instructions stored thereon that are capable of being executed by a computer system to cause operations comprising:

storing metadata for one or more applications in one or more database tables of a multi-tenant database system, wherein the metadata includes one or more custom database table definitions that specify sets of fields included in one or more custom database tables, wherein the fields include one or more tenant-specified custom fields that are not included in a standard database table definition used by one or more other tenants of the multi-tenant database system;

storing, in a separate database table from the metadata, manageable state information that specifies permissions for one or more entities to edit the metadata to alter the set of fields included in one of the custom database table definitions; and generating information indicating whether an update to at least one of the one or more applications violates a permission specified by the manageable state information by accessing the manageable state information and without accessing the metadata.

10. The non-transitory computer-readable medium of claim 9, wherein the operations further comprise:

inserting the manageable state information into an organization prior to inserting the metadata into the organization; and using the manageable state information to enforce one or more rules on insertion of the metadata into the organization.

11. The non-transitory computer-readable medium of claim 10, wherein the operations further comprise setting up a short-lived build organization, wherein an application package that includes the one or more applications is validated in the short-lived build organization.

12. The non-transitory computer-readable medium of claim 10, wherein an application package that includes the one or more applications is a new package version that includes one or more changes to a previous package version, wherein the one or more rules are used to determine whether the one or more changes are allowed.

13. The non-transitory computer-readable medium of claim 12, wherein the operations further comprise generating updated manageable state information for the new package version and storing the updated manageable state information separately from metadata for the new package version.

14. The non-transitory computer-readable medium of claim 9, wherein the manageable state information specifies, for each field of the metadata, whether the field is immutable, unmanaged, or managed.

15. The non-transitory computer-readable medium of claim 14, wherein the manageable state information specifies, for ones of managed fields, at least one entity allowed to update the field.

16. A system, comprising:

one or more processing elements; and one or more storage elements having computer instructions stored thereon that are executable by the one or more processing elements to cause operations comprising;

storing metadata for one or more applications in one or more database tables of a multi-tenant database system, wherein the metadata includes one or more custom database table definitions that specify sets of fields included in one or more custom database tables, wherein the fields include one or more tenant-specified custom fields that are not included in a standard database table definition used by one or more other tenants of the multi-tenant database system;

storing, in a separate database table from the metadata, manageable state information that specifies permissions for one or more entities to edit the metadata to alter the set of fields included in one of the custom database table definitions; and generating information indicating whether an update to at least one of the one or more applications violates a permission specified by the manageable state information by accessing the manageable state information and without accessing the metadata.

17. The system of claim 16, wherein the operations further comprise:

inserting the manageable state information into an organization prior to inserting the metadata into the organization; and using the manageable state information to enforce one or more rules on insertion of the metadata into the organization.

18. The system of claim 17, wherein the operations further comprise setting up a short-lived build organization, wherein an application package that includes the one or more applications is validated n the short-lived build organization.

19. The system of claim 17, wherein an application package that includes the one or more applications is a new package version that includes one or more changes to a previous package version, wherein the one or more rules are used to determine whether the one or more changes are allowed.

20. The system of claim 19, wherein the operations further comprise generating updated manageable state information for the new package version and storing the updated manageable state information separately from metadata for the new package version.

* * * * *